(12) United States Patent
Mohr et al.

(10) Patent No.: US 6,328,388 B1
(45) Date of Patent: *Dec. 11, 2001

(54) BRAKE ACTUATION UNIT

(75) Inventors: Kurt Mohr, Halsenbach; Thomas Wagner, Vallendar, both of (DE)

(73) Assignee: Lucas Industries public limited company (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/745,978

(22) Filed: Nov. 8, 1996

(30) Foreign Application Priority Data

Nov. 15, 1995 (DE) .............................. 195 42 657

(51) Int. Cl.[7] ..................................... B60T 13/16
(52) U.S. Cl. .................. 303/10; 188/72.1; 188/72.4; 188/156; 188/162; 303/116.4
(58) Field of Search ................... 188/72.1, 156, 188/158, 72.4, 162; 303/116.4, 10–12, 61–63, 68–69, 116.1, 116.2, 119.1, 116.3; 60/545, 562, 589, 456

(56) References Cited

U.S. PATENT DOCUMENTS

| | | | |
|---|---|---|---|
| 3,790,225 | * | 2/1974 | Wehde . |
| 4,435,021 | * | 3/1984 | Hoenick ......................... 303/116.4 |
| 4,451,094 | * | 5/1984 | Martin ............................. 303/10 |
| 4,456,309 | * | 6/1984 | Rath ............................... 303/116.4 |
| 4,865,399 | | 9/1989 | Adkins et al. . |
| 4,940,294 | * | 7/1990 | Foster ............................. 303/116.4 |
| 5,000,295 | * | 3/1991 | Fargier ........................... 188/72.1 |
| 5,048,899 | * | 9/1991 | Schmitt et al. ................. 303/68 |
| 5,116,077 | * | 5/1992 | Karnopp et al. . |
| 5,573,314 | * | 11/1996 | Akita et al. ..................... 303/10 |
| 5,645,143 | * | 7/1997 | Mohr et al. ..................... 188/72.1 |
| 5,722,744 | * | 3/1998 | Kupfer et al. .................. 303/115.2 |
| 6,102,493 | * | 8/2000 | Schmitt ............................ 303/116.1 |

FOREIGN PATENT DOCUMENTS

| | | | |
|---|---|---|---|
| 2208936 | | 9/1972 | (DE) . |
| 3542184 | * | 6/1987 | (DE) . |
| 3903532A1 | | 8/1989 | (DE) . |
| 3844305 | * | 7/1990 | (DE) . |
| 4310061A1 | | 9/1994 | (DE) . |
| 19542657 | * | 5/1997 | (DE) . |
| 0092896 A1 | | 11/1983 | (EP) . |
| B 0286504 | | 11/1990 | (EP) . |
| 0774391 | * | 5/1997 | (EP) . |
| 5147524 | * | 6/1993 | (JP) ..................... 303/116.4 |
| WO 95/19901 | | 7/1995 | (WO) . |

OTHER PUBLICATIONS

Bosch Automation Technology Division Training Book entitled "Hydraulics. Theory and Applications," by Werner Göetz, copyright 1998 OMEGA Fachliteratur, Ditzingen, Germany, pp. 25, 34–35, 38, 39, and 64–66.

* cited by examiner

Primary Examiner—Douglas C. Butler
(74) Attorney, Agent, or Firm—MacMillan, Sobanski & Todd, LLC (57) ABSTRACT

The present invention relates to a brake actuation unit comprising a cylinder/piston arrangement which acts on at least one brake lining which can be brought into frictional engagement with a brake disk, a hydraulic pump which is hydraulically connectable with a pressure chamber of the cylinder/piston arrangement in order to move the cylinder of the cylinder/piston arrangement relative to the piston of the cylinder/piston arrangement, and a motor for driving the hydraulic pump.

24 Claims, 8 Drawing Sheets

BRAKE ACTUATION UNIT

CROSS-REFERENCE TO RELATED APPLICATIONS

This application claims priority to German Patent Application 195 42 657.6, filed Nov. 15, 1995.

BACKGROUND OF THE INVENTION

The present invention relates to a brake actuation unit comprising a cylinder/piston arrangement which acts on at least one brake lining which can be brought into frictional engagement with a brake disk, a hydraulic pump which is hydraulically connectable with a pressure chamber of the cylinder/piston arrangement in order to move the cylinder of the cylinder/piston arrangement relative to the piston of the cylinder/piston arrangement, and a motor for driving the hydraulic pump.

From EP 286 504 B1 a hydraulic brake actuation device with an electric control system is known which comprises a body and a brake piston which is suitable for sliding in the body parallel to its axis and which together with it defines a main control chamber which is connected to a pump via a pressure line. The pump is driven via an output shaft of the electric motor. The pump is connected to a brake fluid reservoir via an inlet line. A circuit line which is controlled by a solenoid valve selectively connects the main control chamber with the reservoir. The reservoir is formed in the body. The electric motor is secured on said body. The pump has a variable volume pump chamber which is formed in said body and which is partially limited by one end of a plunger which is supported in said body and the opposite end of which is connected with the output shaft of the electric motor via a mechanism. This mechanism converts the rotational movement of the shaft into a reciprocating movement of the plunger. An inlet valve in the inlet line as well as an outlet valve are arranged in the return line in the body. The axis of the output shaft of the electric motor is aligned perpendicularly to the axis of the plunger. A crankshaft is supported by the shaft and rests resiliently against the body in order to keep the plunger permanently resting against the crankshaft.

In view of the fact that this brake actuation unit has a radial piston pump which, due to heavy pressure pulsations, does not enable adequate controllability, this arrangement is not suited for a sensitive pressure modulation, e.g. for an antislip control system. Moreover, this brake actuation unit requires an additional solenoid valve for relieving the hydraulic pressure, which results in an increased number of components. It is also disadvantageous that the pump is directly connected with the brake piston.

SUMMARY OF THE INVENTION

The invention is consequently based on the object to provide an improved brake actuation unit which is suited for the application of an antislip control system, a driving dynamics control system, a vehicle-to-vehicle ranging control system, a hill hold control system or an antiblock control system.

In order to solve this problem, the hydraulic pump can be brought into a pressure build-up, a pressure holding, and a pressure relief position.

Further characteristics and embodiments are the subject matter of subclaims.

DESCRIPTION OF THE DRAWINGS

The invention will be explained with reference to drawings in which:

FIGS. 3a1, 3a2, 3b1, 3b2, 3c1, and 3c2 schematically show construction and function of a particularly advantageous embodiment of a pump for an electrically controlled brake actuation unit according to the invention.

DETAILED DESCRIPTION OF THE INVENTION

Figure 1:
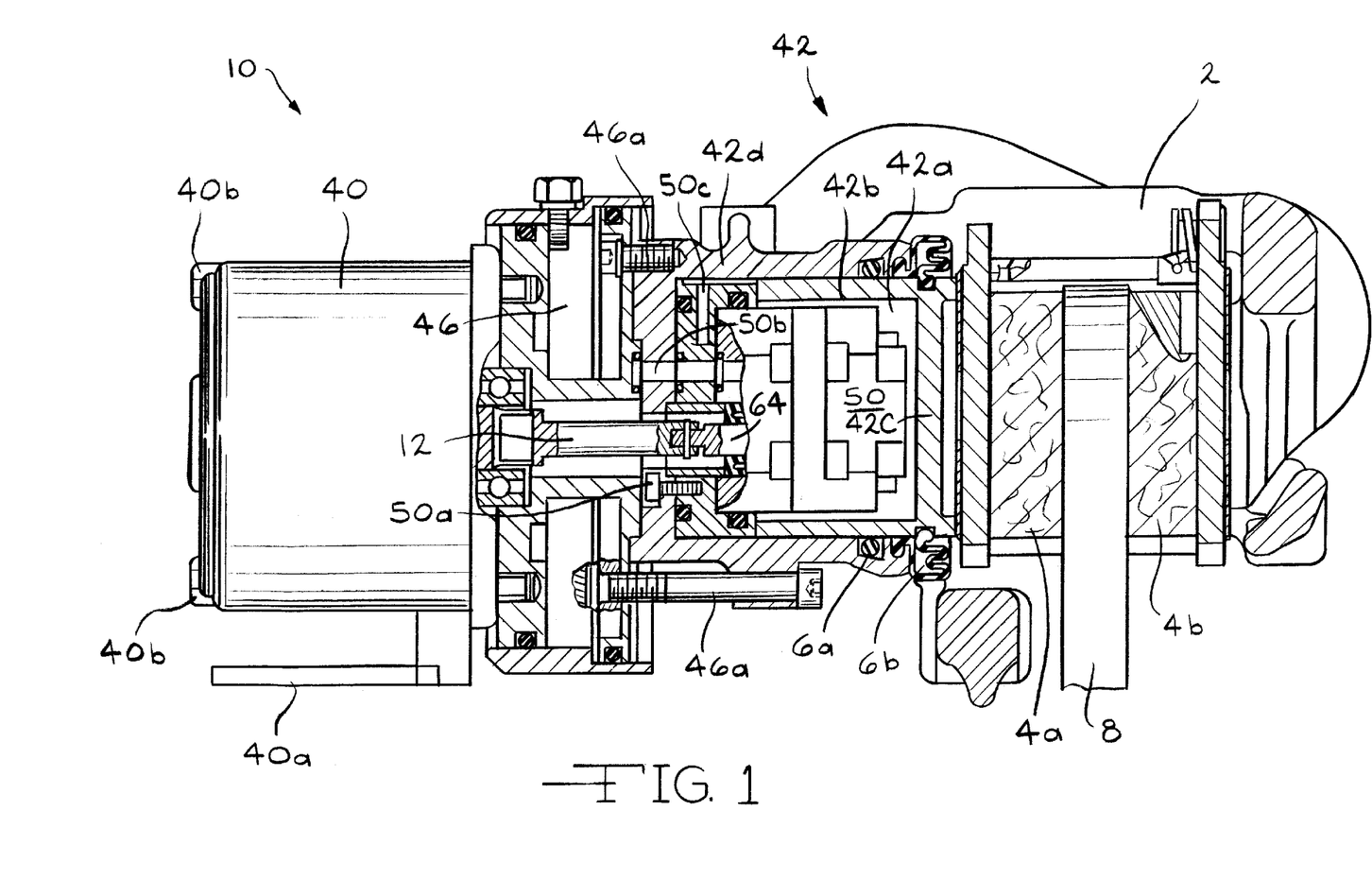
FIG. 1 shows an embodiment of an electrically controlled brake actuation unit according to the invention.

FIG. 1 shows an electrically controlled brake actuation unit 10 according to the invention. The brake actuation unit 10 comprises a piston/cylinder arrangement 42 which is formed by a brake cylinder 42b which accommodates a brake piston 42c in an axially sliding manner. The brake piston 42c acts upon a first brake block 4a which, together with a second brake block 4b, acts upon two opposite surfaces of a brake disk 8. A wheel brake caliper 2 which is integrally connected with the brake cylinder 42b straddles the brake disk 8 and secures the first and second brake block 4a, 4b.

The hydraulic sealing of the brake piston 42c against the brake cylinder 42b is effected by a seal 6a which is arranged in a truncated cone shaped circumferential groove of the brake cylinder 42b. The seal 6a also serves for pulling back or resetting the brake piston 42c in order to avoid a sliding of the brake blocks 4a, 4b against the brake disk 8 with the brake actuation unit 10 being not activated. This resetting operation is also referred to as "rollback". In addition, a seal 6b is provided for sealing the cylinder/piston arrangement 42 against dust and moisture.

In order to modulate the brake pressure in the pressure chamber 42a, a pump 50 is mounted on the bottom of the brake cylinder 42b by means of fastening elements 50a. The pump 50 is driven by an electric motor 40. For this purpose the drive shaft 64 of the pump 50 is transmission coupled to the electric motor 40 via a coupling element 12. The electric motor 40 is controlled by an electronic control unit (not shown) via an electric connecting line 40a.

A brake fluid reservoir 46 which radially surrounds the coupling element 12 is arranged between the electric motor 40 and the brake cylinder 42b. The brake fluid reservoir 46 is attached to a housing 42d of the piston/cylinder arrangement 42 by means of connecting elements 46a, while the electric motor 40 is attached to the brake fluid reservoir 46 by means of connecting means 40b. However, it is also possible to attach the electric motor 40 directly to the housing 42d of the cylinder/piston arrangement 42 and to arrange the brake fluid reservoir 46 in such a manner that it surrounds the electric motor 40 radially in order to save installation space in this manner.

The pump 50 is connected with the brake fluid reservoir 46 via a first channel 50b and with the pressure chamber 42a via a second channel 50c. In order to modulate the brake pressure the pump 50 can be switched between two directions of delivery, which is effected by means of reversing the direction of rotation of the electric motor 40. In order to increase the brake pressure in the pressure chamber 42a the pump 50 is operated in the one direction so that brake fluid is drawn from the brake fluid reservoir 46 via the first channel 50b and delivered into the pressure chamber 42a via the second channel 50c. In order to decrease the brake pressure in the pressure. chamber 42a the pump 50 is operated in the other direction so that brake fluid is drawn from the pressure chamber 42a via the second channel 50c and returned into the brake fluid reservoir 46 via the first channel 50b.

The pump 50 is arranged in the pressure chamber 42a in such a manner that it does not contact the brake piston 42c. Therefore, the mechanical properties of the brake, in particular, the "rollback", are not affected, for example, by additional frictional forces acting on the brake piston 42c.

Figure 2:
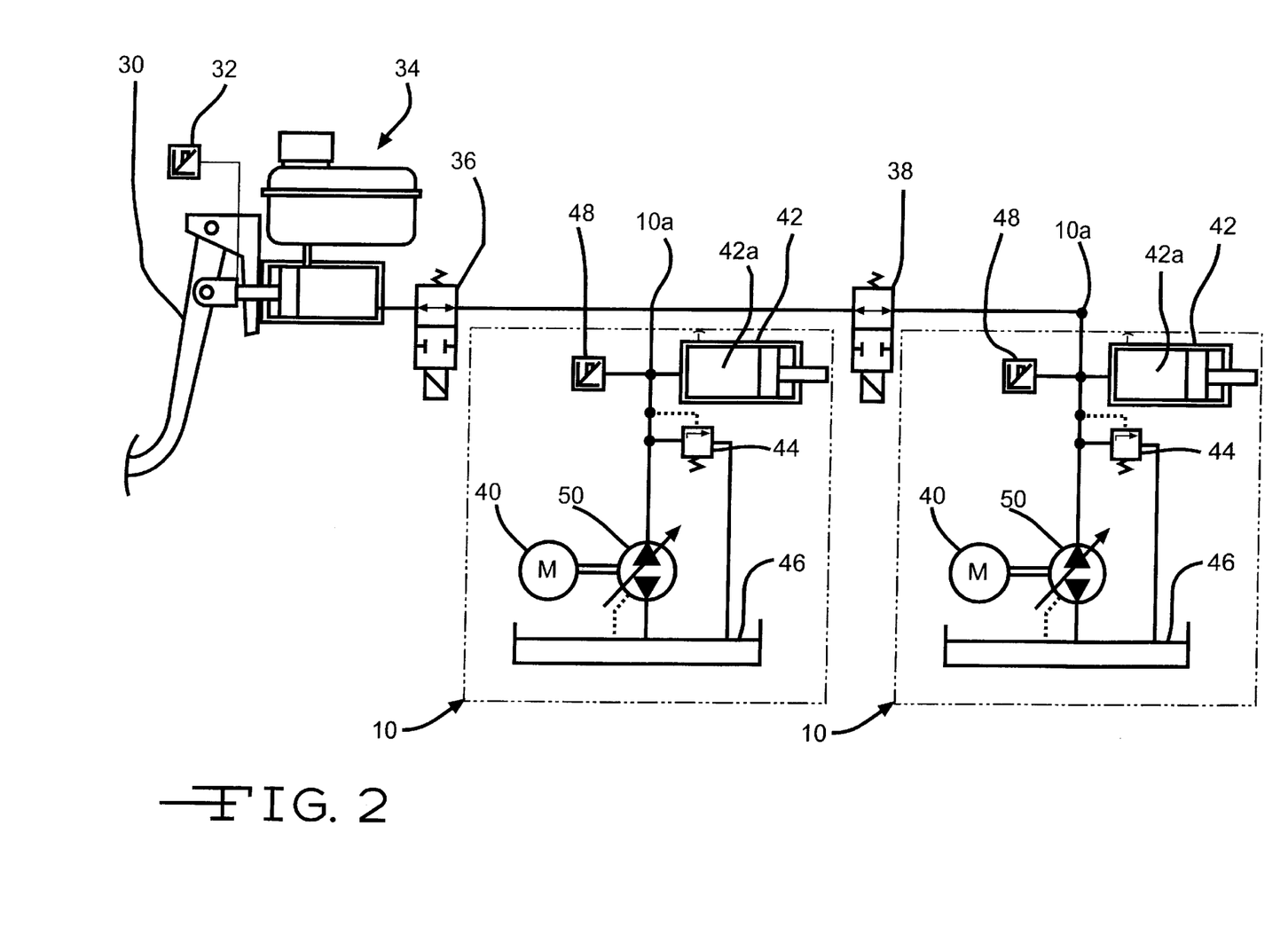
FIG. 2 schematically shows a particularly advantageous braking system in which an electrically controlled brake actuation unit according to the invention is employed for one axle of a vehicle.

The operation of the inventive electrically controlled brake actuation unit 10 will be explained below in more detail with reference to a brake system. For this purpose, FIG. 2 gives a schematic representation of a particularly advantageous brake system which is obtained by using the inventive electrically controlled brake actuation unit for the wheel brakes of one axle of a vehicle.

The electrically controlled brake actuation unit 10 comprises a pump 50 which is driven by an electric motor 40 for the actuation of a piston/cylinder arrangement 42. The pump 50 is connected with a brake fluid reservoir 46. In addition, a pressure limiting valve 44 is arranged in parallel to the pump 50, which upon exceeding a predetermined pressure in the pressure chamber 42a of the piston/cylinder arrangement 42 drains the excess brake fluid directly into the brake fluid reservoir 46.

The brake system is a so-called "brake-by-wire" system. This means that a parameter which is related to an actuation of the brake pedal 30 by the driver (e.g. pedal travel, pedal force or pedal actuation speed) is sensed by means of a sensor arrangement 32. The sensor arrangement 32 supplies a corresponding input signal to an electronic control system (not shown) for evaluation in order to provide electrical control signals for brake actuation units 10. This enables normal braking operations and antiblock control operations to be carried out. A brake system of this type also offers the possibility to drive the brake actuation units 10 automatically, i.e. independent of an actuation of the brake pedal 30, so that, amongst others, antislip control, driving dynamics control, vehicle-to-vehicle ranging control and hill hold control can be performed.

The conversion of the electrical signals, which are provided by the electronic control system (not shown) for the modulation of the brake pressure, is effected in the brake actuation unit 10 by means of the electric motor 40 which drives the pump 50. The direction of rotation of the electric motor 40 can be reversed so that the pump 50 can be switched for two directions of delivery. In the first delivery direction the pump 50 delivers brake fluid from the reservoir 46 into the pressure chamber 42a of the cylinder/piston arrangement 42 in order to build up the brake pressure. In the second delivery direction the pump 50 returns brake fluid from the pressure chamber 42a of the piston/cylinder arrangement 42 into the brake fluid reservoir 46 so that the brake pressure is relieved.

A quasi-constant brake pressure in the pressure chamber 42a of the cylinder/piston arrangement 42 can be adjusted by a defined time sequence of pressure build-up and pressure relief phases. In order to maintain a brake pressure in the pressure chamber 42a of the piston/cylinder arrangement 42 actually constant it is, among other things, possible to separate the pressure chamber 42a of the piston/cylinder arrangement 42 from the pump 50 for the duration of the pressure relief phases. The pump 50 can be shut off for the duration of the pressure relief phase so that electric energy is saved. This proves to be particularly advantageous with pressure relief phases with a long duration which, for example, occur with constant deceleration of the vehicle during downhill drives. In order to save an additional solenoid valve and primarily the required control electronics, the use of a pump 50 which is designed to be mechanically self-locking is advantageous which separates the pressure chamber 42a of the piston/cylinder arrangement 42 from the pump 50 with the electric motor 40 shut off in order to keep the brake pressure constant. Thus, as used in this application, the term "self-locking" when used with respect to a pump means that the pump is designed as one of the types of pumps known where pressure at a discharge (outlet) of the pump will not be readily relieved through the pump when the electric motor for the pump is shut off.

The electric control signals which are supplied by the electronic control system (not shown) to the electric motor 40 are current, voltage and pulse width modulation signals which are capable not only of reversing the direction of rotation, but also of varying the speed of the electric motor 40 so that not only the direction of delivery but also the delivery quantity of the pump 50 is adjustable. The gradients of the pressure build-up and the pressure relief are variable via the adjustment of the delivery quantity so that a very good controllability for driving the brake actuation unit 10 is obtained. In order to carry out the pressure modulation on a closed control loop, a sensor arrangement 48 is provided in the brake actuation unit 10, which senses the actually prevailing pressure in the pressure chamber 42a of the piston/cylinder arrangement 42. The sensing of the pressure actually prevail in the piston/cylinder arrangement 42 also serves as a safety monitoring operation of the brake actuation unit 10.

The above described brake actuation unit 10 already represents an independent system which is coupled with a wheel brake in the vehicle and only requires to be electrically driven by an electronic control system (not shown). In view of this, the hydraulic connection 10a indicated in FIG. 2 is not mandatory for a "brake-by-wire" system. The hydraulic connection 10a, however, permits further supplementary functions to increase the efficiency and the system safety, which result in considerable advantages of the inventive brake actuation unit 10 compared to a so-called "dry" brake actuation means. The term "dry" brake actuation unit in this context refers to such a unit where an electric motor drives a spindle which immediately acts upon a wheel brake, i.e. which does not comprise any hydraulic components, in particular brake fluid.

On the one hand, the hydraulic connection 10a provides the possibility of hydraulically coupling the actuation units 10 of the wheel brakes of one axle of the vehicle. For this purpose, a solenoid valve 38 is arranged between the connections 10a, which in the electrically inactive condition connects the connections 10a to one another and in the electrically active condition closes the connections 10a against one another. When the connections 10a are connected, the pressure chamber 42a of the piston/cylinder arrangements 42 are hydraulically short-circuited so that the same pressure level is obtained in the pressure chambers 42*a* of the piston/cylinder arrangements 42, which compensates differences in the control behaviour of the individual actuations units 10 which can occur due to manufacturing tolerances. This is particularly advantageous in the case of a normal braking operation because the same braking behaviour as with a conventional hydraulic brake system results at the wheels of an axle so that the stability of the vehicle is ensured. With an antiblock control system it is also possible to set a "select low" control mode at the rear rear axle of the vehicle in a simple manner. If, however, an individual regulation of the brake pressure in the wheel brakes is required which, among other things, is the case for an anti-block control system, an antislip control system or a driving dynamics control system, the hydraulic connection between the pressure chambers 42*a* of the piston/cylinder arrangements 42 is separated by electrically controlling the solenoid valve 38.

When a pump 50 is used which is designed to be mechanically self-locking in order to maintain a constant pressure level in the pressure chamber 42*a* of the piston/cylinder arrangement 42 with the electric motor 40 switched off, the case may occur due a mechanical or electrical defect that a brake pressure prevailing in the pressure chamber 42*a* of a piston/cylinder arrangement 42 can no longer be relieved. For counteracting such a safety-critical driving condition, a hydraulic connection to the pump 50 of the opposite actuation unit 10 can be made in such a case in order to return the brake fluid. The prerequisite for this is that the brake fluid reservoir 46 has a sufficient capacity. It is also possible with the solenoid valve 38 in the opened position to build up the brake pressure in the pressure chambers 42*a* of both piston/cylinder arrangements 42 via only one pump 50 in order to carry out at least normal braking operations, provided that a sufficient fluid volume is available.

On the other hand, it is possible to couple the actuation unit 10 with a so-called "push-through" system via the hydraulic connection 10*a* for a hydraulic emergency operation. The hydraulic emergency system comprises a brake pressure transducer 34 which is mechanically acutated via the brake pedal 30. A solenoid valve 36 is arranged between the brake pressure transducer 34 and the actuation units 10 of at least one axle of the vehicle. In the electrically inactive condition, the solenoid valve 36 makes a connection between the brake pressure transducer 34 and the actuation unit 10 so that in the case of a failure of the electrical supply voltage in the vehicle, a brake actuation by the hydraulic emergency system is possible. Otherwise, the solenoid valve 36 closes the connection between the brake pressure transducer 34 and the actuation unit 10 with the electrical supply voltage in the vehicle being available and the electrical system being defect-free so that the brake actuation is effected exclusively by the electrical system.

Construction and function of a particularly advantageous embodiment of the pump 50 will be explained with reference to FIGS. 3*a*1 through 3*c*2. Each of FIGS. 3*a*2, 3*b*2, and 3*c*2 shows a schematical longitudinal section of the pump 50, while each of FIGS. 3*a*1, 3*b*1, and 3*c*1 shows a section along line C–D of FIGS. 3*a*2, 3*b*2, and 3*c*2, respectively.

Figure 3A:
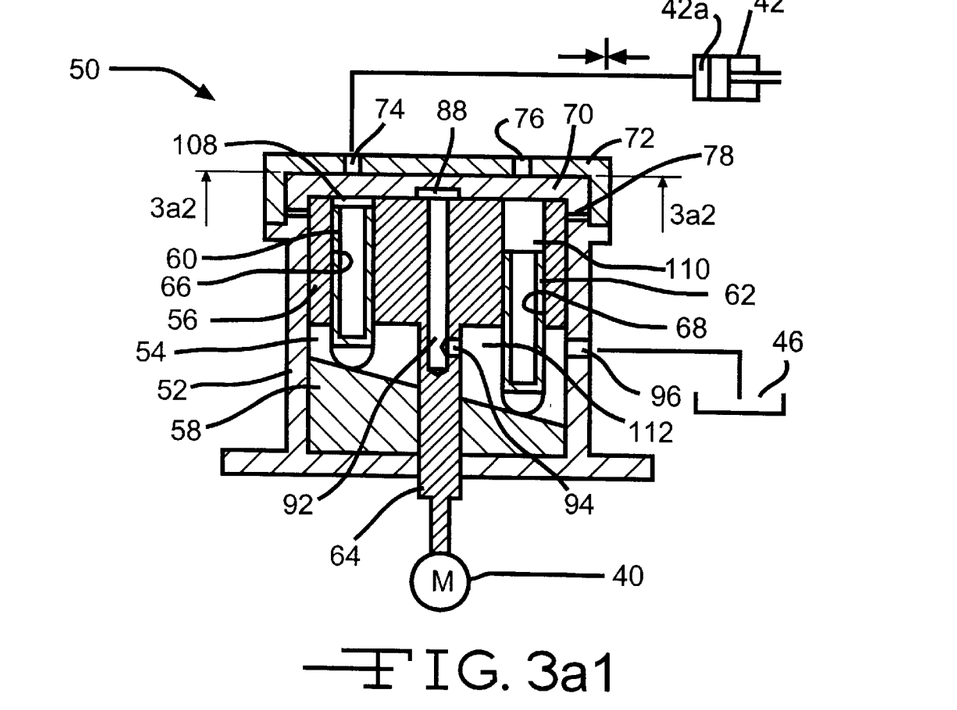
Figure 3A:
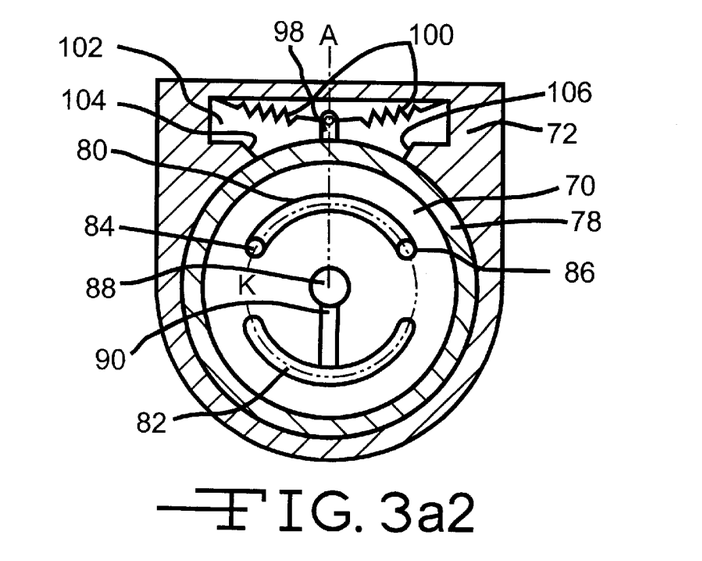

As can be seen from FIGS. 3*a*1 and 3*a*2, the pump 50 is designed as an axial piston pump. The axial piston pump is essentially rotation symmetrical with respect to an axis A. Therefore, a housing 52 has a circular cylindrical hole 54 which accommodates a cylinder drum 56 so as to be rotatable about the axis A. Through holes 66, 68 are arranged in the cylinder drum 56 parallel to the axis A on a circle K in which two pistons 60, 62 are slidably accommodated. The pistons 60, 62 bear against an inclined disk 58 which is arranged stationary in the bottom of the circular cylindrical hole 54. The cylinder drum 56 is (integrally) connected with a drive shaft 64 which penetrates the inclined disk 58 and the housing 52 in the direction of the axis A. The drive shaft 64 is transmission coupled with an electric motor 40 for driving the axial piston pump.

Figure 4:
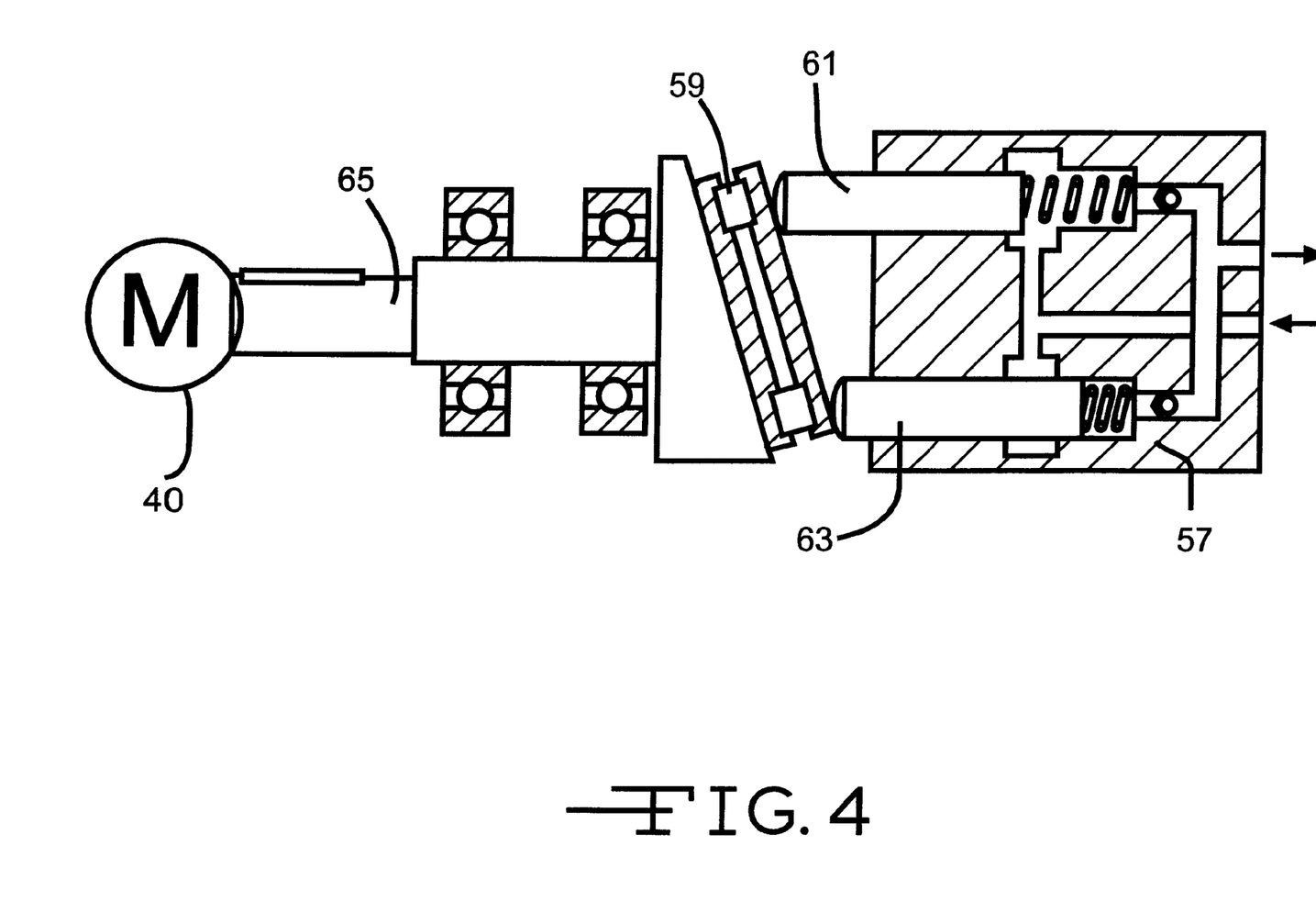
FIG. 4 is a schematic cross-sectional view of a wobble-plate machine which can be used as a pump for an electrically controlled brake actuation unit according to the invention.

Such an axial piston pump is also referred to as an "inclined disk machine" because the drive shaft 64 and the cylinder drum 56 are arranged equi-axial, the supporting (inclined) disk 58 is stationary, and the cylinder drum 56 is driven by the electric motor 40 via the drive shaft 64. Contrary to this, axial piston pumps with a stationary cylinder drum and a driven supporting disk are referred to as "wobble-plate machines". "Wobble-plate machines (e.g., pumps) are conventional in the art. FIG. 4 illustrates a wobble-plate pump 51, including a stationary cylinder drum 57 with axially slidable pistons 61 and 63, and a rotatory supporting disk 59 which is arranged transversely to the drum 57. The disk 59 can be driven by a motor 40 via a drive shaft 65 to actuate the pistons 61, and 63 to cause the pump 51 to pump."

A lid 72 is securely connected with the housing 52 for closing the housing 52 in a tight manner on its top. The lid 72 has a first and a second connection 74, 76 both of which are formed as through holes in parallel to the axis A on the circle K. The two connections 74, 76 communicate with the pressure chamber 42*a* of one cylinder/piston arrangement 42.

Between the cylinder drum 56 and the lid 72 a control disk 70 is arranged to be rotatable about the axis A. As a centering means with respect to the axis A the control disk 70 is provided with a circumferential edge 78 which is radially guided along the circumference of the cylinder drum 56.

The control disk 70 and the pistons 60, 62 define pressure spaces 108, 110 in the holes 66, 68 of the cylinder drum 56. In order to increase the volume of the pressure spaces 108, 110 each of the pistons 60, 62 is designed as a hollow cylinder.

On the face associated with the cylinder drum 56, the control disk 70 is provided with a first and a second arc-shaped groove 80, 82 which are arranged on the circle K. A first and a second hole 84, 86 are arranged at either end of the first arc-shaped groove 80 on the circle K and penetrate the control disk 70. The control disk 70 also comprises a centrally arranged circular cylindrical chamber 88 on the face associated with the cylinder drum 56; said chamber is connected with the second arc-shaped groove 82 via another groove 90.

The centrally arranged circular cylindrical chamber 88 in the control disk is connected via a central hole 92 which is arranged in the cylinder drum 56 or the drive shaft 64, respectively, as well as via radial hole 94 with an inner space 112 which communicates with a brake fluid reservoir 46 via a connection 96 arranged at the housing 52.

A radially outwardly directed driving pin 98, which projects into a recess 102 of the lid 72, is attached to the control disk 70. The driving pin 98 is coupled with a spring arrangement 100 which consists of two identical, though oppositely acting spring elements which are supported in the recess 102 of the lid 72 in a stationary manner. When the cylinder drum 56 is not driven, as shown in FIGS. 3*a*1 and 3*a*2, no sliding friction forces are transmitted from the upper face of the cylinder drum 56 to the lower face of the control disk 70 and thus to the driving pin 98 so that the control disk 70 is held by the spring arrangement 100 in the basic position shown in FIGS. 3a1 and 3a2.

In the basic position of the control disk 70 as shown in FIG. 3a, the first and the second connection 74, 76 are closed so that a pressure level prevailing in the pressure chamber 42a of the cylinder/piston arrangement 42 is maintained constant. The setting of the so-called "pressure holding phase" is thus achieved by simply switching off the electric motor 40.

Figure 3B:
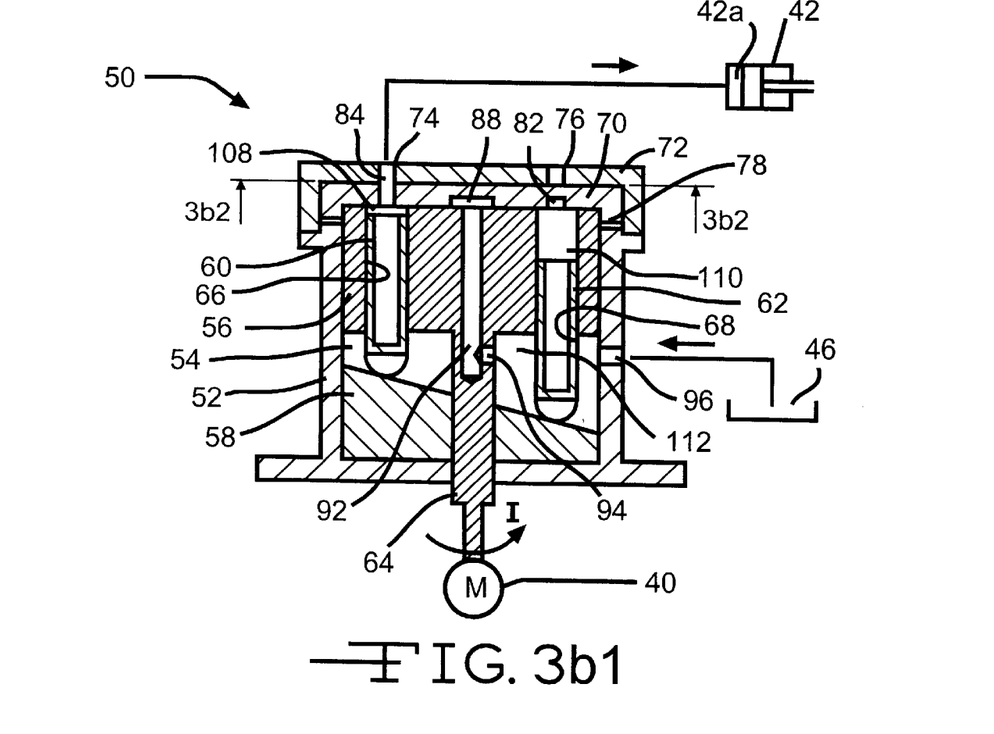
Figure 3B:
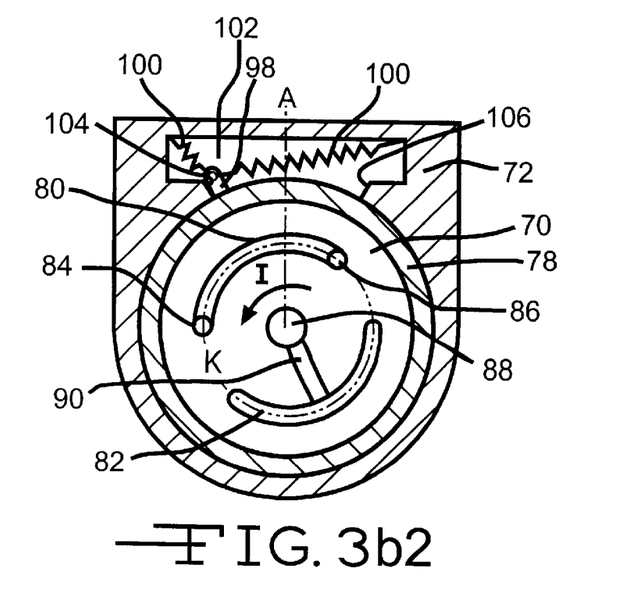

The setting of a so-called "pressure build-up phase" is shown in FIGS. 3b1 and 3b2. For this purpose, the cylinder drum 56 is driven by the electric motor 40 in a first sense of direction I (here counter-clockwise). Sliding friction forces are then transmitted from the upper face of the cylinder drum 56 to the lower face of the control disk 70 and thus to the driving pin 98, which counteract the spring forces applied to the driving pin 98 by the spring arrangement 100. The spring arrangement 100 is dimensioned in such a manner that the sliding frictional forces which are effective upon the drive of the cylinder drum 56 are always sufficient for a rotation of the control disk 70 against the spring force of the spring arrangement 100 about the axis A until the driving pin 98 abuts a first stop 104 and the control disk 70 assumes the position illustrated in FIGS. 3b1 and 3b2.

The arrangement of the first and the second arc-shaped groove 80, 82 in the control disk 70 is dimensioned in such a manner that in the position of the control disk 70 shown in FIGS. 3b1 and 3b2 the first through hole 84 arranged in the first arc-shaped groove 80 extends equi-axially to the first connection 74 and the second connection 76 is closed. The drive of the cylinder drum 56 causes the two pistons 60, 62 to carry out mutually opposed reciprocating movements. While one of the pressure chambers 108, 110 communicates with the second arc-shaped groove 82, the associated piston 60, 62 carries out a downward stroke in order to draw in brake fluid from the brake fluid reservoir 46. The suction path thereby extends over the connection 96, the inner space 112, the holes 94 and 92, the chamber 88, the groove 90, as well as the second arc-shaped groove 82. After the suction operation, the respective pressure chamber 108, 110 is connected with the first arc-shaped groove 80, while the associated piston 60, 62 carries out an upward stroke in order to supply the pressure chamber 42a of the cylinder/piston arrangement 42 with the brake fluid which has been drawn into the pressure chamber 108, 110, with the delivery path leading via the first arc-shaped groove 80, the first through hole 84 and the first connection 74.

Figure 3C:
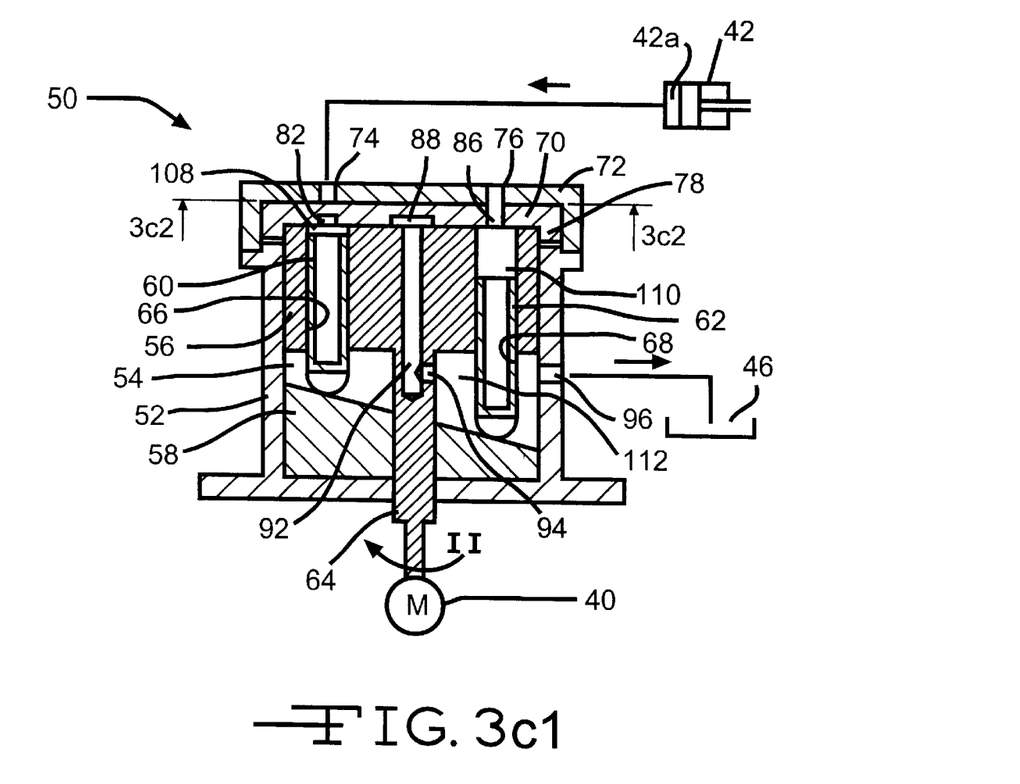
Figure 3C:
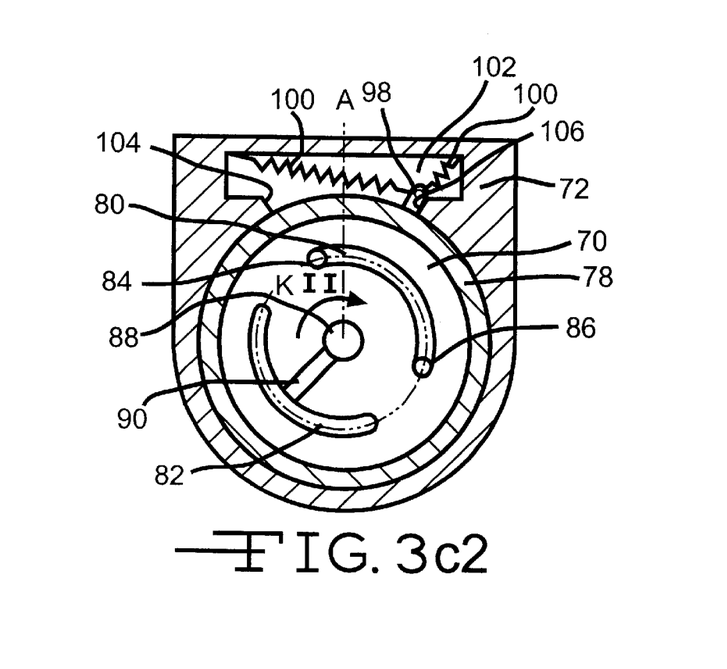

FIGS. 3c1 and 3c2 show the setting of a so-called "pressure relief phase". For this purpose, the cylinder drum 56 is driven by the electric motor 40 in a second sense of direction II (here clockwise). Due to the sliding friction forces which occur between the contact faces of the cylinder drum 56 and the control disk 70, the driving pin 98 abuts a second stop 106 so that the control disk 70 assumes the position shown in FIGS. 3c1 and 3c2.

In the position of the control disk 70 as shown in FIGS. 3c1 and 3c2, the second through hole 86 which is arranged in the first arc-shaped groove 80 extends equiaxially with the second connection 76 and the first connection 74 is closed. While one of the two pressure chambers 108, 110 communicates with the first arc-shaped groove 80, the associated piston 60, 62 carries out a downward stroke in order to draw in brake fluid from the pressure chamber 42a of the cylinder/piston arrangement 42. The suction path thereby extends over the second connection 76, the second through hole 86, as well as the first arc-shaped groove 80. After the suction operation, the respective pressure chamber 108, 110 is connected with the second arc-shaped groove 82, while the associated piston 60, 62 carries out an upward stroke in order to return the brake fluid which has been drawn into the pressure chamber 108, 110 into the brake fluid reservoir 46. The return delivery is thereby made via the second arc-shaped groove 82, the groove 90, the chamber 88, the holes 92 and 94, the inner space 112, as well as the connection 96.

Figure 3D:
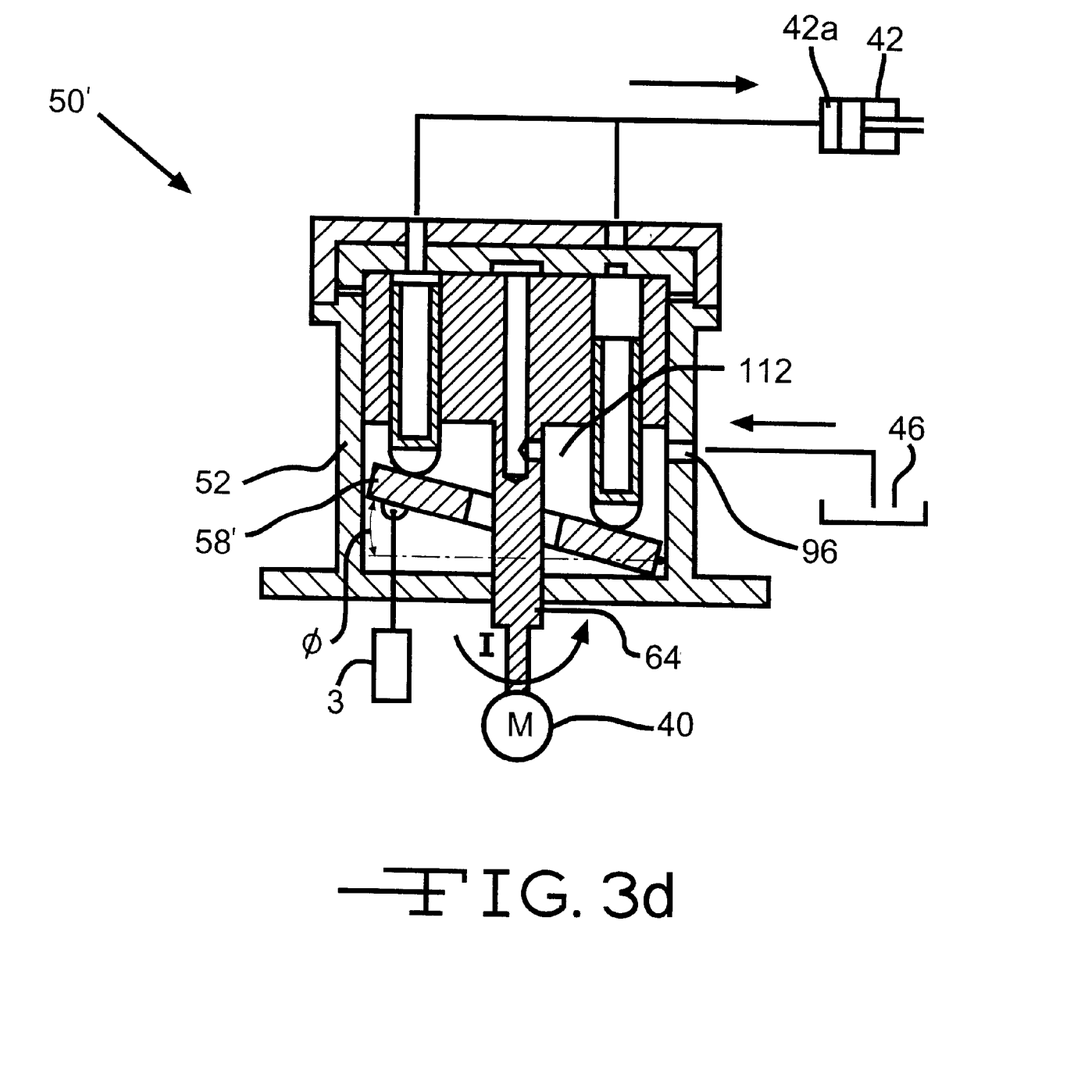
FIG. 3d is a schematic longitudinal section of a pump for an electrically controlled brake actuation unit according to the invention, the pump including an electromagnetic adjusting mechanism for adjusting the inclination angle of a supporting disk relative to a cylinder drum.

With the embodiment of an axial piston pump as shown in FIGS. 3a1 through 3c2 the inclination angle of the inclined (supporting) disk 58 relative to the cylinder drum 56 is constant. The delivery volume of the pump can be modified by varying the inclination angle. In the case of an inclination angle equal to zero, i.e. the inclined (supporting) disk 58 is arranged perpendicularly to the axis A of the cylinder drum 56, no fluid will be delivered so that a pressure holding phase can also be set in this manner. The control disk 70 can therefore be replaced by an inclined (supporting) disk 58, the inclination of which can be adjusted via an adjusting mechanism, with the adjusting mechanism positioning the inclined (supporting) disk 58 perpendicularly to the axis A of the cylinder drum 56 when the electric motor 40 is switched off in order to save electric energy during the pressure holding phases. Preferably, the hydraulic pump includes an adjustment mechanism adapted to precisely control the delivery capacity of the hydraulic pump within a tolerance of about 1 bar of pressure It is also possible to actuate such an adjusting mechanism in an electromagnetic manner, which also applies to the control disk 70, the adjustment of which is effected by utilizing the sliding friction forces. Such an electromagnetic actuation is then to be coupled electrically with the existing electrical control means of the electric motor 40 in order to save the expenditure for an additional electrical control means. The current supplied to the electric motor 40 can therefore simultaneously energize the solenoid of such an electromagnetic actuation means. The electromagnetic actuation means is then to be designed in such a manner that in the de-energized condition, i.e. with the electric motor 40 not driven, the pressure holding phase is set by straight positioning the inclined (supporting) disk 58 or by positioning the control disk 70 according to FIGS. 3a1 and 3a2. Due to the fact that the pressure build-up and pressure relief phases are set as a function of the delivery direction of the pump 50 which results from the sense of rotation of the electric motor 40 and thus from the direction of the current, the respective inclination of the inclined (supporting) disk 58 or the positioning of the control disk 70 can be set according to FIGS. 3b1 and 3b2 or FIGS. 3c1 and 3c2 with reference to the current direction. FIG. 3d illustrates an axial piston pump 50' including an adjustable supporting disk 58'. The inclination angle Ø of the supporting disk 58' can be adjusted via an adjusting mechanism. In the illustrated embodiment, the adjusting mechanism includes an electromagnetic actuator 3. Preferably, the control of the electromagnetic actuator 3 is coupled with the control of the electric motor 40 (FIG. 1) of the pump 50'.

Figure 5:
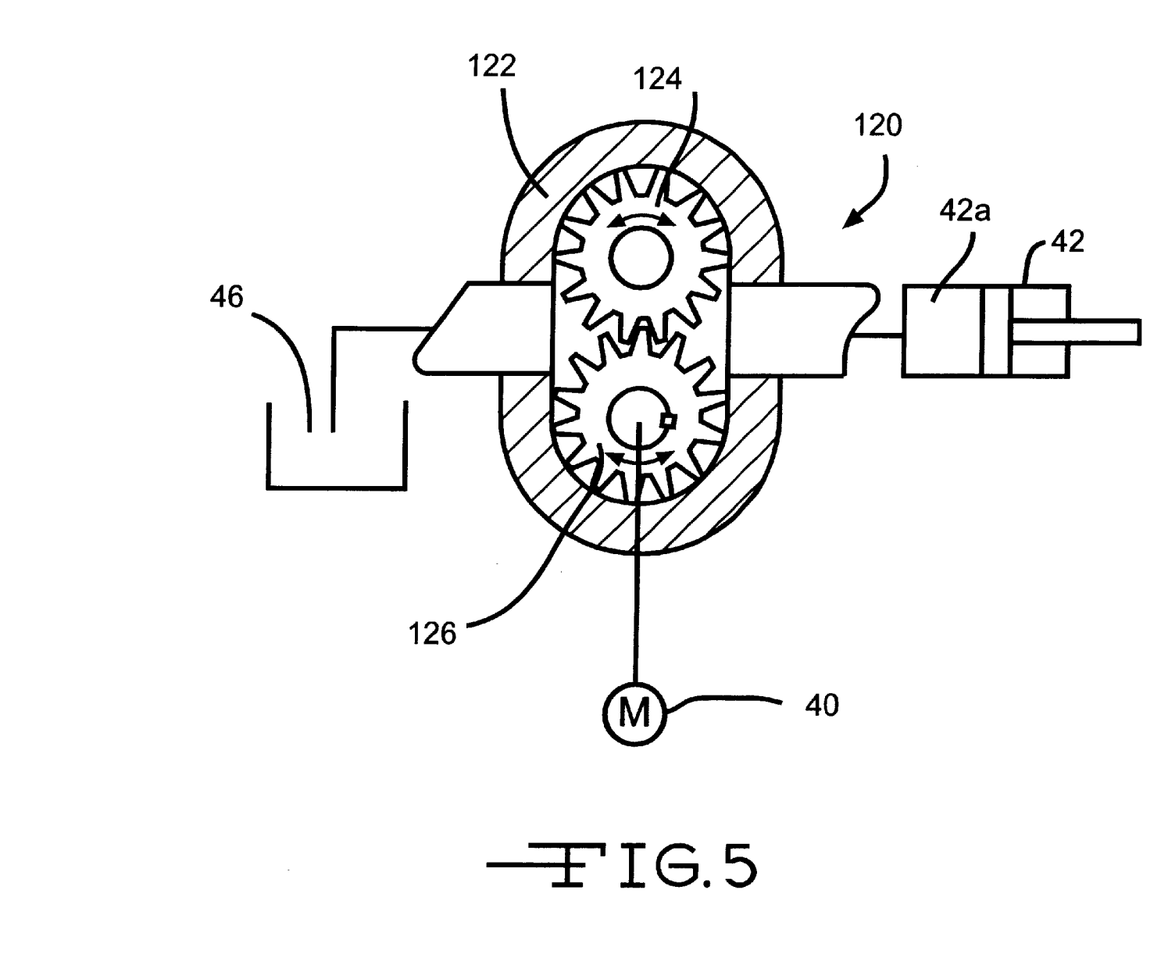
FIG. 5 is a schematic cross-sectional view of a gear pump which can be used as a pump for an electrically controlled brake actuation unit according to the invention.

Finally, it should be mentioned that the pump 50 for the inventive brake actuation unit need not necessarily be limited to the axial piston pump type but that other types, in particular, gear pumps, can be employed as well. Gear pumps are conventional in the art. FIG. 5 illustrates a gear pump 120 including a housing 122 and a pair of meshing, rotatable gears 124 and 126. The gears 124 and 126 can be driven to rotate by a motor 40. The gear pump 120 is adapted to pump brake fluid from a brake fluid reservoir 46 to a pressure chamber 42a of a cylinder/piston arrangement 42.

We claim:

1. A brake actuation unit comprising:
a cylinder/piston arrangement having a cylinder, a piston, and a pressure chamber;
a brake lining acted upon by the cylinder/piston arrangement, which brake lining is disposed to be brought into frictional engagement with a brake disk in response to pressure in the pressure chamber;
a hydraulic pump which is hydraulically connectable with the pressure chamber of the cylinder/piston arrangement in order to move the cylinder of the cylinder/piston arrangement relative to the piston of the cylinder/piston arrangement by selectively varying the pressure in the pressure chamber to move the brake lining relative to the brake disk, characterized in that the hydraulic pump is an axial piston pump which is an inclined disk machine where a supporting disk is stationary and a cylinder drum is rotatable, with at least one pump piston being slidably accommodated within the cylinder drum, with the pump piston performing a reciprocating movement which is positively controlled by the supporting disk when the cylinder drum rotates; and
a motor for driving the hydraulic pump, wherein the hydraulic pump is selectively operable in a pressure build-up, a pressure holding and a pressure relief position to selectively vary the pressure in the pressure chamber.

2. A brake actuation unit according to claim 1, characterized in that the cylinder drum is in sliding frictional engagement with a control element which in a rest position of the hydraulic pump closes a connection between the pressure chamber of the cylinder/piston arrangement and the hydraulic pump and in activated conditions of the hydraulic pump establishes a connection between the pressure chamber of the cylinder/piston arrangement and the hydraulic pump.

3. A brake actuation unit according to claim 2, characterized in that the control element is disk-shaped and comprises a first recess in a surface facing toward the cylinder drum, which first recess is adapted to be brought in connection with a hydraulic fluid path which leads to the pressure chamber of the cylinder/piston arrangement, and which first recess is communicating with a pressureless side of the hydraulic pump.

4. A brake actuation unit according to claim 3, characterized in that the control element further comprises a second recess in a surface facing toward the cylinder drum, which second recess is adapted to be brought in connection with a hydraulic fluid path which leads to the pressure chamber of the cylinder/piston arrangement, and which second recess is adapted to be connected with a pressure side of the hydraulic pump.

5. A brake actuation unit according to claim 4, characterized in that the control element is biased via a spring arrangement in both directions of rotation against sliding frictional forces exerted by the cylinder drum and is adapted to perform a maximum rotational movement which is limited by at least one stop.

6. A brake actuation unit according to claim 2, characterized in that the control element is biased via a spring arrangement in both directions of rotation against sliding frictional forces exerted by the cylinder drum and is adapted to perform a maximum rotational movement which is limited by at least one stop.

7. A brake actuation unit according to claim 3, characterized in that the control element is biased via a spring arrangement in both directions of rotation against sliding frictional forces exerted by the cylinder drum and is adapted to perform a maximum rotational movement which is limited by at least one stop.

8. A brake actuation unit according to claim 1, characterized in that the supporting disk is adapted to be selectively inclined relative to the axis of rotation of the cylinder drum, with the inclination angle of the supporting disk being adjustable and the supporting disk being lockable at the respective inclination angle.

9. A brake actuation unit according to claim 8, characterized in that the supporting disk is selectively variable in its inclination and position by means of an electromagnetic actuation means, with the control of the electromagnetic actuation means being coupled with the control of the electric motor of the pump.

10. A brake actuation unit comprising:
a cylinder/piston arrangement having a cylinder, a piston, and a pressure chamber;
a brake lining acted upon by the cylinder/piston arrangement, which brake lining is disposed to be brought into frictional engagement with a brake disk in response to pressure in the pressure chamber;
a hydraulic pump which is hydraulically connectable with the pressure chamber of the cylinder/piston arrangement in order to move the cylinder of the cylinder/piston arrangement relative to the piston of the cylinder/piston arrangement by selectively varying the pressure in the pressure chamber to move the brake lining relative to the brake disk, characterized in that the hydraulic pump is an axial piston pump which comprises a stationary cylinder drum with an axially slidable piston and a rotatory supporting disk; and
a motor for driving the hydraulic pump, wherein the hydraulic pump is selectively operable in a pressure build-up, a pressure holding and a pressure relief position to selectively vary the pressure in the pressure chamber.

11. A brake actuation unit according to claim 10, characterized in that the cylinder drum is in sliding frictional engagement with a control element which in a rest position of the hydraulic pump closes a connection between the pressure chamber of the cylinder/piston arrangement and the hydraulic pump and in activated conditions of the hydraulic pump establishes a connection between the pressure chamber of the cylinder/piston arrangement and the hydraulic pump.

12. A brake actuation unit according to claim 11, characterized in that the control element is disk-shaped and comprises a first recess in a surface facing toward the cylinder drum, which first recess is adapted to be brought in connection with a hydraulic fluid path which leads to the pressure chamber of the cylinder/piston arrangement, and which first recess is communicating with a pressureless side of the hydraulic pump.

13. A brake actuation unit according to claim 12, characterized in that the control element further comprises a second recess in a surface facing toward the cylinder drum, which second recess is adapted to be brought in connection with a hydraulic fluid path which leads to the pressure chamber of the cylinder/piston arrangement, and which second recess is adapted to be connected with a pressure side of the hydraulic pump.

14. A brake actuation unit according to claim 13, characterized in that the control element is biased via a spring arrangement in both directions of rotation against sliding frictional forces exerted by the cylinder drum and is adapted to perform a maximum rotational movement which is limited by at least one stop.

15. A brake actuation unit according to claim 11, characterized in that the control element is biased via a spring arrangement in both directions of rotation against sliding frictional forces exerted by the cylinder drum and is adapted to perform a maximum rotational movement which is limited by at least one stop.

16. A brake actuation unit according to claim 12, characterized in that the control element is biased via a spring arrangement in both directions of rotation against sliding frictional forces exerted by the cylinder drum and is adapted to perform a maximum rotational movement which is limited by at least one stop.

17. A brake actuation unit according to claim 10, characterized in that the supporting disk is adapted to be selectively inclined relative to the axis of rotation of the cylinder drum, with the inclination angle of the supporting disk being adjustable and the supporting disk being lockable at the respective inclination angle.

18. A brake actuation unit according to claim 17, characterized in that the supporting disk is selectively variable in its inclination and position by means of an electromagnetic actuation means, with the control of the electromagnetic actuation means being coupled with the control of the electric motor of the pump.

19. A brake actuation unit according to claim 10, characterized in that the hydraulic pump is designed not self-locking and a controllable valve is arranged between the pressure chamber and the hydraulic pump in order to maintain the hydraulic pressure in the pressure chamber constant when the hydraulic pump is deactivated.

20. A brake actuation unit for providing hydraulic braking force for a single wheel in response to electrical signals generated by actuation of a brake pedal and electrical signals generated independently of actuation of said brake pedal, said brake actuation unit comprising:

a cylinder/piston arrangement having a housing defining a cylinder, a piston, and a pressure chamber;

a brake lining acted upon by the cylinder/piston arrangement, which brake lining is disposed to be brought into frictional engagement with a brake disk in response to pressure in the pressure chamber;

a self-locking hydraulic pump disposed substantially in the housing which is in direct hydraulic communication with the pressure chamber of the cylinder/piston arrangement in order to move the cylinder of the cylinder/piston arrangement relative to the piston of the cylinder/piston arrangement by selectively varying the pressure in the pressure chamber to move the brake lining relative to the brake disk; and a motor for driving the hydraulic pump, wherein the hydraulic pump is selectively operable in a pressure build-up, a pressure holding and a pressure relief position to selectively vary the pressure in the pressure chamber.

21. The brake actuation unit according to claim 20, wherein the pump includes an adjustment mechanism for controlling a delivery capacity of the pump within a tolerance of about 1 bar of pressure.

22. A brake actuation unit according to claim 20, characterized in that the hydraulic pump is an axial piston pump.

23. A brake actuation unit according to claim 22, characterized in that the axial piston pump is an inclined disk machine where a supporting disk is stationary and a cylinder drum with at least one pump piston which is slidably accommodated therein being arranged so as to be rotatable, with the pump piston performing a reciprocating movement which is positively controlled by the supporting disk when the cylinder drum rotates.

24. A brake actuation unit for providing hydraulic braking force for a single wheel in response to electrical signals generated by actuation of a brake pedal and electrical signals generated independently of actuation of said brake pedal, said brake actuation unit comprising:

a cylinder/piston arrangement having a housing defining a cylinder, a piston, and a pressure chamber;

a brake lining acted upon by the cylinder/piston arrangement, which brake lining is disposed to be brought into frictional engagement with a brake disk in response to pressure in the pressure chamber;

a hydraulic pump disposed substantially in the housing which is in hydraulic communication with the pressure chamber of the cylinder/piston arrangement in order to move the cylinder of the cylinder/piston arrangement relative to the piston of the cylinder/piston arrangement by selectively varying the pressure in the pressure chamber to move the brake lining relative to the brake disk, the axial piston pump comprising a stationary cylinder drum with an axially slidable piston and a rotatory supporting disk which is arranged transversely to the drum; and a motor for driving the hydraulic pump, wherein the hydraulic pump is selectively operable in a pressure build-up, a pressure holding and a pressure relief position to selectively vary the pressure in the pressure chamber.

\* \* \* \* \*